United States Patent [19]

Hakala et al.

[11] Patent Number: 5,210,991
[45] Date of Patent: May 18, 1993

[54] METHOD FOR MAKING THE FOUNDATION SLABS OF A PAPER MACHINE BEFORE THE INSTALLATION PROPER OF THE MACHINE

[75] Inventors: Jaakko Hakala, Korpilahti; Eero Savolainen, Jyväskylä, both of Finland

[73] Assignee: Valmet Paper Machinery Inc., Finland

[21] Appl. No.: 707,464

[22] Filed: May 30, 1991

[30] Foreign Application Priority Data

Jun. 7, 1990 [FI] Finland .................................. 902838

[51] Int. Cl.$^5$ .............................................. E04B 1/08
[52] U.S. Cl. ...................................... 52/743; 409/131; 409/181; 248/679
[58] Field of Search ................ 248/678, 679; 52/743; 409/131, 132, 175, 181

[56] References Cited

U.S. PATENT DOCUMENTS 3,190,041  6/1965  Kimball .............................. 248/679

FOREIGN PATENT DOCUMENTS 1189800  3/1965  Fed. Rep. of Germany ...... 248/679
3315405  10/1984  Fed. Rep. of Germany ...... 248/678
551514  2/1943  United Kingdom .

Primary Examiner—Carl D. Friedman
Assistant Examiner—Christopher T. Kent
Attorney, Agent, or Firm—Steinberg & Raskin

[57] ABSTRACT

The invention concerns a method for making the foundation slabs of a paper machine. In the method, reinforcement strands are fitted inside a mold for a base beam. Before filling-concreting of the mold, a base slab provided with a plurality of foundation bolts is installed in connection with the reinforcement strands and preferably on support of said strands. After the slab has been installed as sufficiently planar manner with its face horizontal, the filing-concreting of the base slab is carried out. Upon drying of the concrete cast, the final tightening of the foundation bolts of the base slab is carried out. The ultimate machining of the base slab is carried out on site in the mill space by passing a machining device supported by guides rails which have been adjusted to a horizontal level along faces of the base slab.

4 Claims, 3 Drawing Sheets

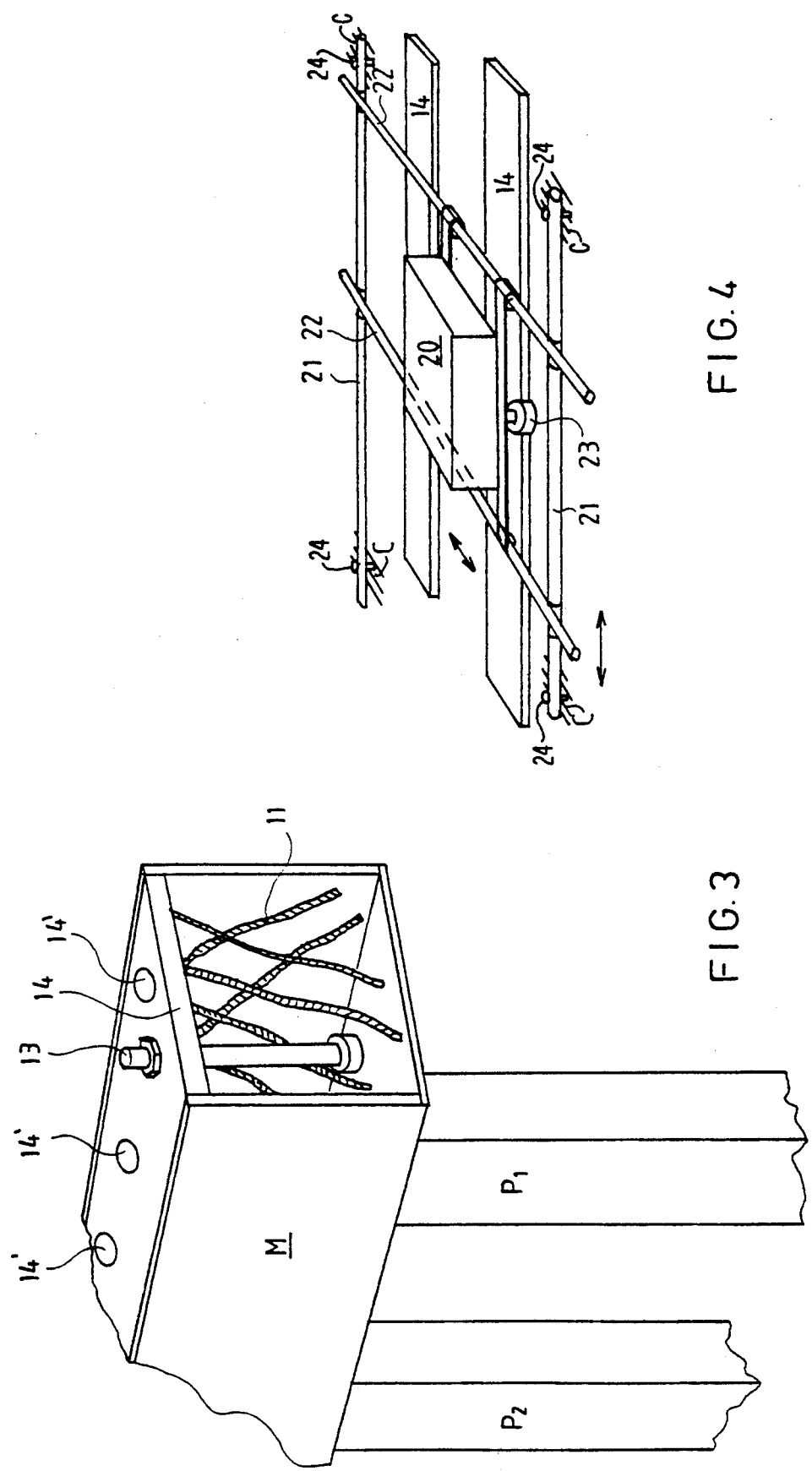

METHOD FOR MAKING THE FOUNDATION SLABS OF A PAPER MACHINE BEFORE THE INSTALLATION PROPER OF THE MACHINE

BACKGROUND OF THE INVENTION

The invention concerns a method for making the foundation slabs of a paper machine before the installation proper of the machine.

A method for the making of the foundation of a paper machine is known in the prior art. In this method, as a first step a support beam is cast with reinforcement strands. Hole reservations are then made in the support beam for bolts. The slab is installed while the base bolts hang freely and fit into the reservations. The bolts of the foundation slab are then fixed by concreting. Below the foundation slab mounted on the reinforcement strands at the top face of the base beam a so-called filling, i.e. installation pieces, is fitted. After the desired correct plane position of the foundation slab has been achieved in the positioning of the slab, a so-called filling-concreting is carried out between the slab and the base beam. Then the bolts in the slab are tightened. Thus, before the filling-concreting, the slab must be positioned very precisely to achieve a plane position.

The working step mentioned above is quite difficult, time-consuming and, therefore, costly.

SUMMARY OF THE INVENTION

An object of the present invention is to provide an improvement of the above method for installation and manufacture of a base slab of a paper machine.

In view of above-mentioned object and others, the present invention is related to method for making the foundation slabs of a paper machine before the installation proper of the machine. The base beam is formed by casting it on site into a mold. Reinforcement strands are installed into the mold, onto which strands the foundation slab is already mounted at this stage. The foundation slab is mounted approximately in the correct location, an accuracy of ±5 mm of the plane position being sufficient. Thereafter, the concreting into the mold is carried out, and, after the concrete has become dry, the bolts are tightened. In the final stage, the machining of the base slab is carried out on site by running the machining device from one end of the slab to the other along guide rails fixed to the foundation.

By means of the present invention, an accuracy of ±0.15 mm of the plane position can be met, and the threaded holes can be machined more accurately than by prior-art methods.

An important aspect of the method in accordance with the present invention is that with regard to the concreting of the base beam, reinforcement strands are fitted inside a mold and that before filling-concreting of the mold, the base slab is installed in connection with the reinforcement strands and preferably on support of the reinforcement strands. Another important aspect of the present invention is that after the slab has been installed as sufficiently plane and with its face horizontal, the filling-concreting of the base slab is carried out and upon drying of the concrete cast, the bolts undergo their final tightening. In the method of the present invention, the ultimate machining of the base slab is carried out on site in the mill space by pressing a machining device on support of guides, which have been adjusted to a horizontal level, along the slab faces.

BRIEF DESCRIPTION OF THE DRAWINGS

The following drawings are illustrative of embodiments of the invention and are not meant to limit the scope of the invention as encompassed by the claims.

FIG. 3 illustrates the method in accordance with the invention, wherein, before the filling-concreting, the base slab is supported on the mould and installed on the reinforcement strands in a sufficiently accurate plane position.

FIG. 4 is a schematic illustration of a so-called on-site machining device, by whose means, on site in the factory space, the base slab is finishing-machined to bring it into a horizontal plane.

DETAILED DESCRIPTION

Figure 1:
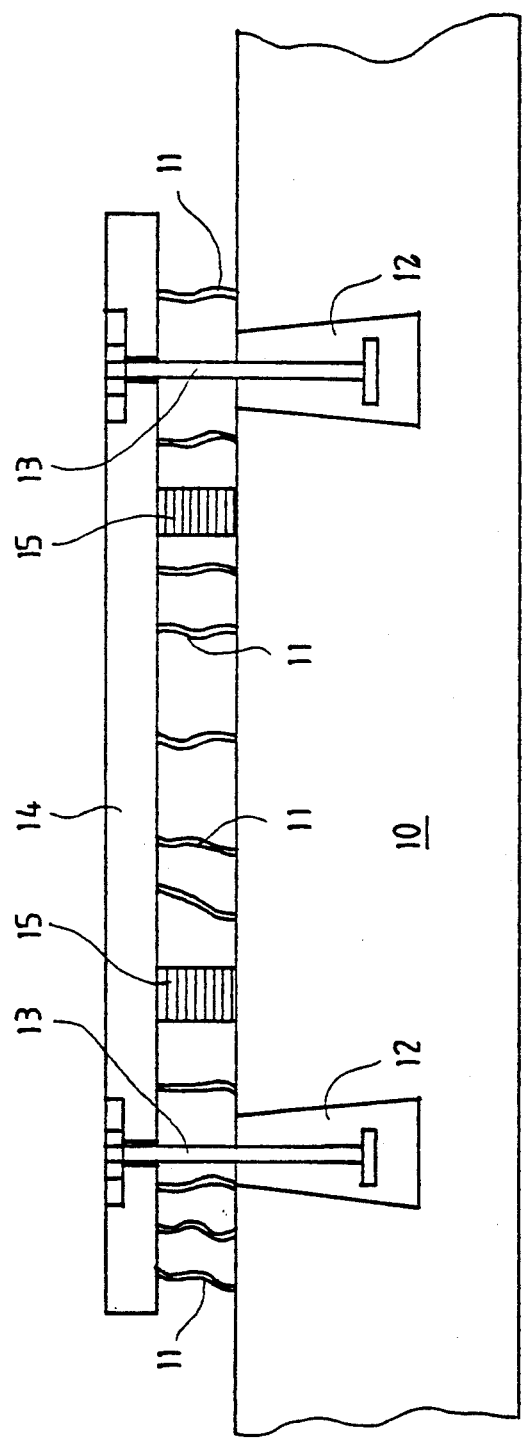
FIG. 1 is a schematic illustration of a prior art method for installation of the base slab based on filling.

FIG. 1 illustrates a prior art method for making of the foundation. When the base beam 10 is being cast, reinforcement strands 11 are fitted at the top face of the beam 10 and, in the same connection, hole reservations 12 are made for the bolts 13. After the casting of the concrete, the base slab 14 of steel with its hanging bolts 13 are placed on support of the reinforcement strands 11. The slab 14 is fitted in an accurate horizontally plane position by means of so-called filling, i.e. fitting pieces 15. After a suitable plane position has been achieved, so-called filling-concreting is carried out between the top face of the beam 10 and the slab 14. In the final step the bolts 13 of the slab are tightened.

Figure 2:
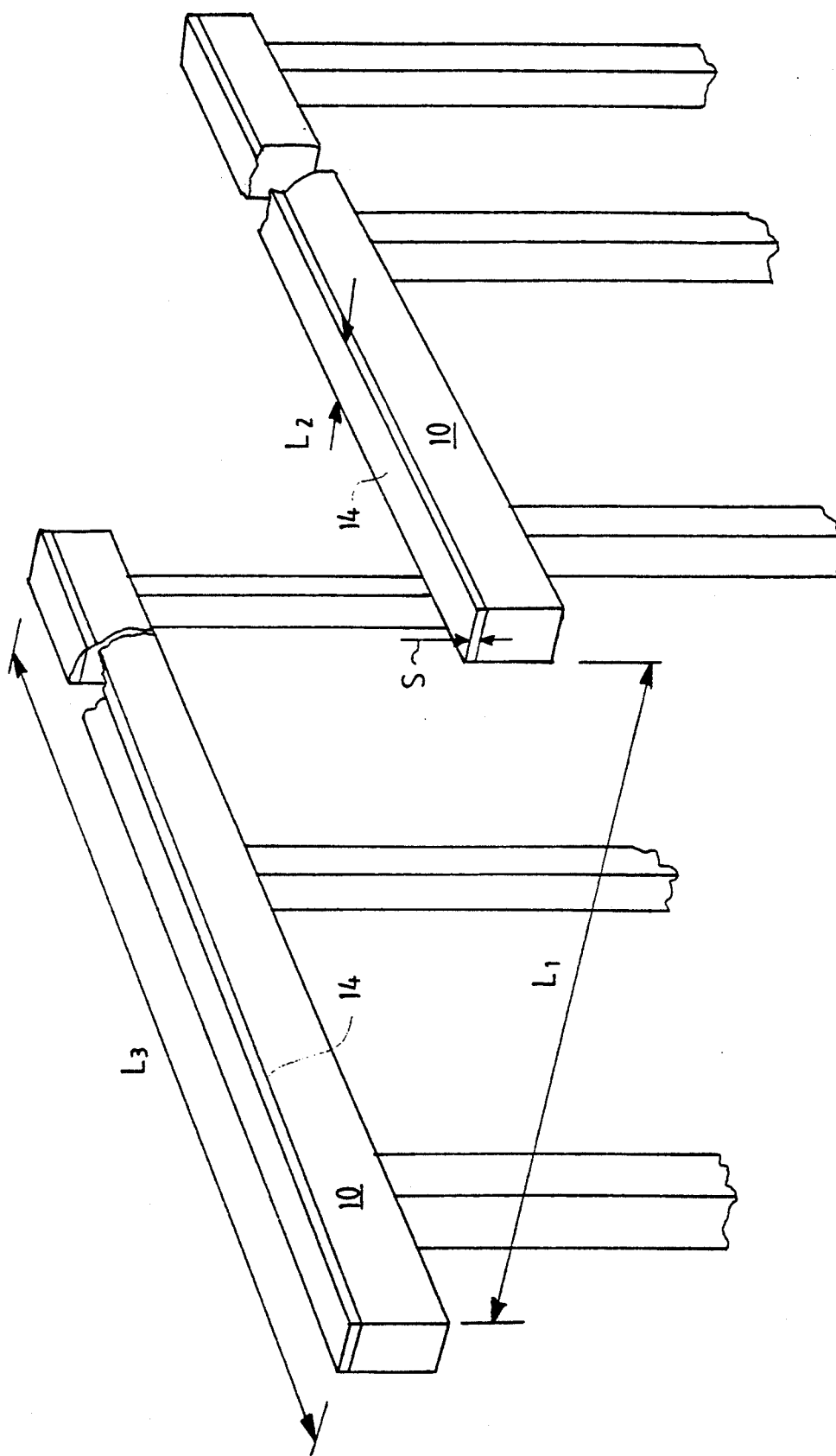
FIG. 2 shows the location of two base slabs in relation to one another. One of the base slabs is supported against the bottom of the paper machine at one side of the paper machine, and the other slab against the bottom of the paper machine, in the machine direction, at the other side of the paper machine.

FIG. 2 is an axonometric view of base slabs 14 installed on base beams 10. In this Figure, dimensional quantities are indicated to illustrate the relative positions and the dimensional proportions of the slabs. $L_1$ represents the distance between the slabs, which is, e.g. from about 5 to about 12 m. The width $L_2$ of each slab is, e.g. from about 0.6 to about 0.7 m. The length $L_3$ of each line of slabs is, e.g. from about 30 to about 80 m, depending on the length of the paper machine. The thickness S of a slab is, e.g. from about 60 to about 150 mm. The required accuracy of the plane position is preferably about 0.25 mm.

In the prior art solutions, the machinings of the slab 14 were carried out in workshops, and the holes in the slabs and the other reservations employed in the fixing of a paper machine were also made separately in workshops. The stage of installation itself required high precision, because the slab was installed in its ultimate position, determined by the requirement of plane position, before the filling-casting. After-machining was not carried out.

In the present invention, the difficult working step has been substantially avoided via the entirely novel method of installation and manufacture of base slabs which has been provided.

As is shown in FIG. 3, the base beam 10, which is placed on the beams $P_1$, $P_2$, is made by concreting it in the factory space on site into the mold M. The reinforcement strands 11 are fitted into the mold M, and the base slab 14 with its foundation bolts 13 is fitted, with a requirement of accuracy of preferably about ±5 mm of plane position, onto the reinforcement strands 11. At this stage, the filling-concreting is carried out immediately through the holes 14' in the slab 14. Upon drying of the concrete, the bolts 13 of the slab 14 are tightened. The filling-casting holes 14' are not needed necessarily, because, as a rule, the slab is narrower than the width of the concreting space, so that the filling-casting can be carried out between the slab 14 and the mold M wall.

According to the invention, the ultimate machining of the base slab is carried out as an on-site run of the factory hall by bringing an on-site grinding device 20 into connection with the base slabs 14 and by guiding the grinding device 20 on the guide rails 21 along the slab faces.

FIG. 4 illustrates the ultimate grinding of a base slab 14 in accordance with the invention. The base slab 14 is installed after the filling-casting into the mold so that its face becomes horizontal, and the ultimate machining is carried out to an accuracy of about ±0.15 mm of the plane position by means of machining carried out on site by guiding the grinding and/or milling blade 23 on the horizontally installed guides 21,22 and by means of drilling units fitted on the sledge, completing the threaded holes 25 to be made into the slabs. The grinding device 20 is guided on the guide rails 21, and after each cycle of longitudinal feeding the device with its guide rails is displaced on the transverse guide rails 22. The guide rails 21 and 22 are fixed to the concrete base C by holes 24, so that, by means of the device, sufficient feed forces are achieved in the grinding situation. The guides 21, 22 are placed in the horizontal plane before grinding. Hereupon the grinding or milling blade 23 of the device 20 is fed into the slab base to be machines.

The examples provided above are not meant to be exclusive. Many other variations of the present invention would be obvious to those skilled in the art, and are contemplated to be within the scope of the appended claims.

We claim:

1. A method for making the foundation slabs of a paper machine comprising
   casting a base beam in a mold and fitting reinforcement strands into the base beam inside said mold,
   installing a base slab having a plurality of foundation bolts onto said reinforcement strands such that a face of said base slab lies in a horizontal plane with an accuracy of about ±5 mm of a sufficiently desirable planar position such that said base slab defines an upper surface of said mold, and thereafter
   concreting said mold by pouring a casting material into said mold through filling-casting holes provided in said base slab or through a space between said base slab and a wall of said mold
   allowing the concrete cast to dry and then tightening said foundation bolts to a final tightened position, and
   carrying out the ultimate machining of said base slab by passing a machining device support by guides which have been adjusted to a horizontal level, along faces of said base slab.

2. The method of claim 1, further comprising carrying out said ultimate machining of said base slab on site in a mill space, and fixing said guides of said machining device to the concrete constructions of the building during the ultimate machining process.

3. The method of claim 2, further comprising installing said base slab after the pouring of a casting material into said mold with a requirement of accuracy of about ±5 mm of the plane position, so that said face of said base slab becomes substantially horizontal, and the ultimate machining is carried out to an accuracy of about ±0.15 mm of said plane position by means of machining carried out on site by guiding a grinding and/or milling blade on said horizontally installed guides and completing threaded holes to be made into said base slab by means of drilling units fitted on said base slab.

4. The method of claim 3, further comprising guiding said machining device on said horizontally installed guides in a cycle of longitudinal feeding, and thereafter displacing said machining device on transverse guide rails to a next cycle of longitudinal feeding.

* * * * *